United States Patent [19]

Gundy

[11] Patent Number: 4,612,730

[45] Date of Patent: Sep. 23, 1986

[54] MECHANICAL CENTERING APPARATUS AND METHOD

[75] Inventor: William P. Gundy, Amherst, N.H.

[73] Assignee: NPC Systems, Inc., Milford, N.H.

[21] Appl. No.: 770,739

[22] Filed: Aug. 29, 1985

[51] Int. Cl.$^4$ .............................................. B24B 19/02
[52] U.S. Cl. ........................................ 51/3; 51/241 S; 51/327; 125/2; 29/271
[58] Field of Search ............... 51/241 S, 3, 327; 29/271, 272; 125/10

[56] References Cited

U.S. PATENT DOCUMENTS

| | | | |
|---|---|---|---|
| 639,201 | 12/1899 | Basener | 51/241 S |
| 1,013,911 | 1/1912 | Weber | 29/271 |
| 1,889,986 | 12/1932 | Haywood | 29/271 S X |
| 3,458,958 | 8/1969 | Douglas | 125/2 |
| 4,109,635 | 8/1978 | Rossborough | 125/10 |

*Primary Examiner*—Harold D. Whitehead
*Attorney, Agent, or Firm*—Pearson & Pearson

[57] ABSTRACT

A low cost apparatus and method for centering a grinding and cutting apparatus on the face of the spigot or a bell of a reinforced or non-reinforced concrete pipe, manhole riser, or the like. It is mechanical to avoid the expense and uncertainty of hydraulic sensing systems. The four contact guides, one in each quadrant, are each mounted at the lower portion of one of four guide arms, each centrally pivoted to the rotatable support of the machine and each having an upper portion above the pivot connected by an elongated link to one of a pair of rotatable pivot plates. Hydraulic pistons and cylinders maintain a yieldable resistance to turning of the pivot plates. As the base plate of the grinding and cutting apparatus approaches the face of the spigot, with the centering guides extended therebelow, the guides contact the top edge of the pipe or spigot and are forced open relative to each other while forcing the base plate into exact centered position, based on the configuration of the exterior face of the spigot.

3 Claims, 3 Drawing Figures

MECHANICAL CENTERING APPARATUS AND METHOD

BACKGROUND OF THE INVENTION

In U.S. Pat. No. 4,109,635 to Rossborough of Aug. 29, 1978 a machine for cutting a sealing groove around the spigot end of a manhole riser is disclosed in which the machine is supported on the spigot end and centered on the longitudinal axis of the riser so that the groove is cut at a uniform radial distance from the longitudinal axis.

This patent is owned by the assignee of this application and the assignee has found that while such an axis centered groove is useful, it does not take into consideration the fact that there are no reinforcing rods in the cast spigot and it sometimes is not a true truncated cone due to depressions, slight collapse, bumps or the like that develops before, or during, the curing process.

Therefore, in the co-pending patent application of William P. Gundy, Ser. No. 605,463, filed Apr. 30, 1984 and entitled "Spigot Grinder and Groover", also owned by said assignee, a centering system is disclosed having two pairs of diametrically opposed sensors, which contact the outer face of the spigot, one in each quadrant to center the cutting and grinding apparatus on the end of the spigot. Each pair of sensors is oppositely disposed at 180° from the other pair and each sensor is advanced and retracted by one of four hydraulic pistons and cylinders, each pair of hydraulic pistons and cylinders being controlled by one of a pair of master cylinders which cause the slave cylinders to move an equal amount.

The assignee's experience has been that this is an excellent system but it is costly, and requires dependence on electrically controlled hydraulic circuits. Thus, there is a need for a lower cost centering system to satisfy the demands of the trade.

SUMMARY OF THE INVENTION

In this invention, owned by the said assignee, the requirements of dependable, trouble free, low cost centering apparatus and method have been met by providing a novel and unique mechanical linkage system.

The sensors are four guides, such as wheels, each mounted in one of the quadrants around the end of the spigot, and each mounted at the lower end of an arm, the arm being pivoted centrally to the rotatable support of the cutting and grinding apparatus, each of the four arms having an upper portion extending above the pivot. At the center of the rotatable support are two horizontal pivot plates each with two diametrically opposed projecting studs. Four elongated, mechanical links are provided, each connecting the upper portion of one of the four pivoted arms to one of the studs of one of the pivot plates. A pair of fluid actuated pistons and cylinders are also provided, mounted on the rotatable plate and each connected to one of the pivot plates, to act in the manner of a door closer spring to continuously impart a resistance to the linkage and centering wheels when the wheels are being forced apart by contact with the spigot end and are centering the base plate on the end of the spigot.

DESCRIPTION OF A PREFERRED EMBODIMENT

Figure 1:
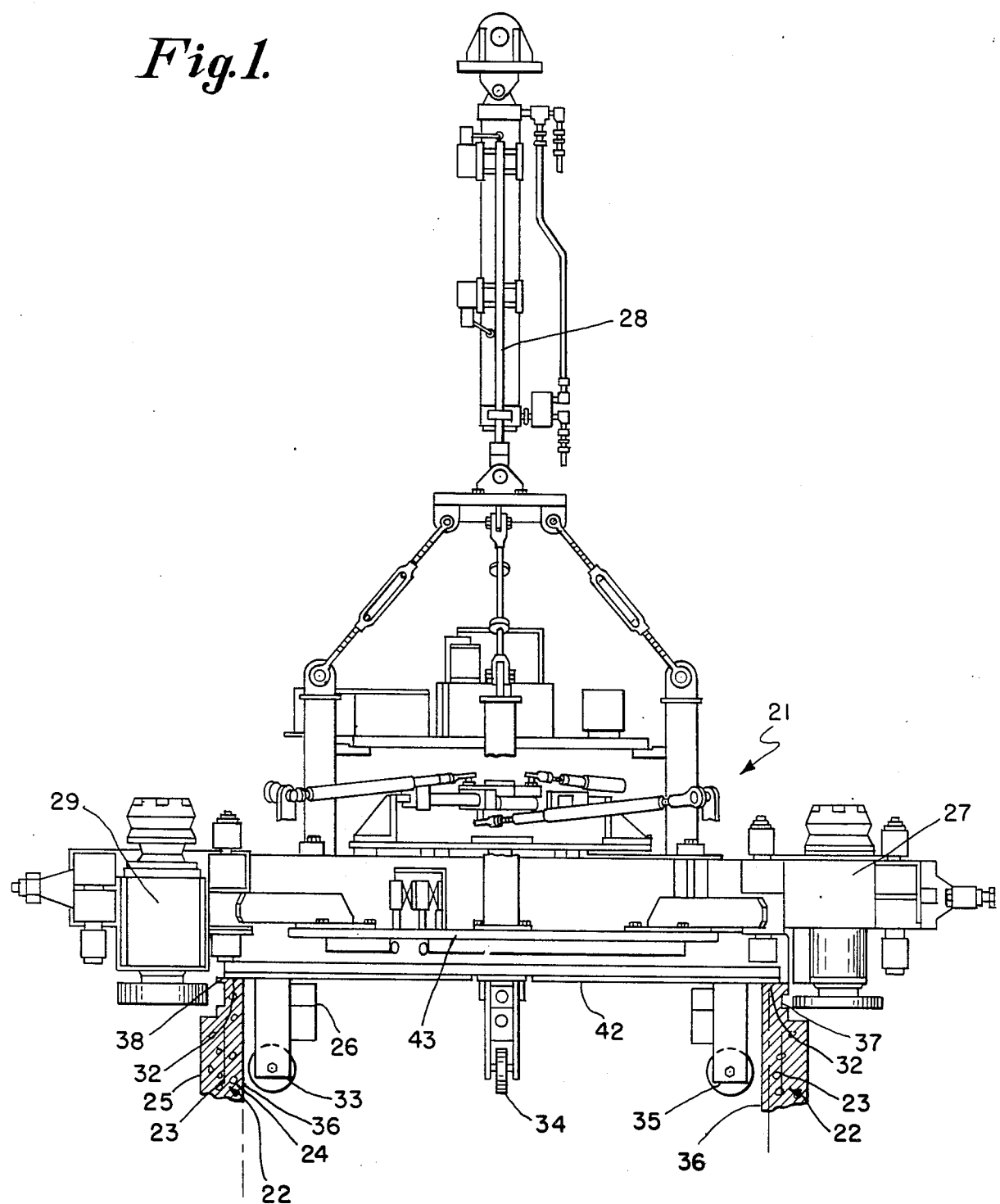
FIG. 1 is a diagrammatic side elevation of a grinding and cutting apparatus with the mechanical centering means of the invention, parts being broken away for clarity.
Figure 2:
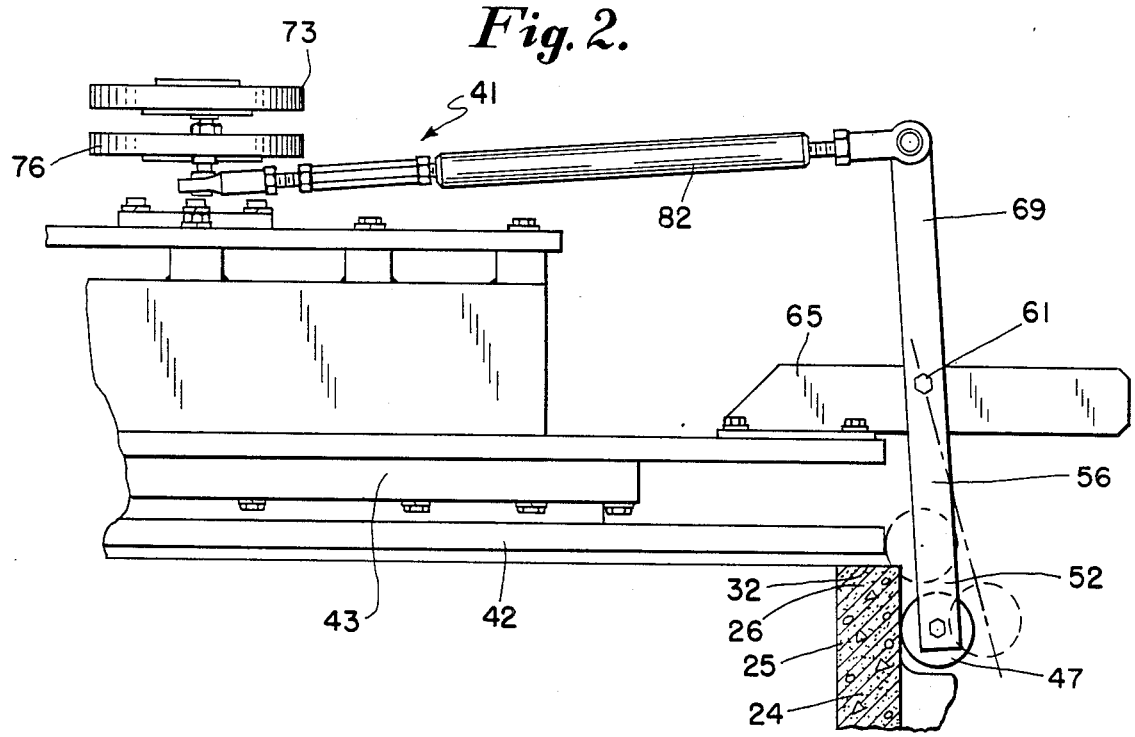
FIG. 2 is an enlarged, fragmentary viewing showing one of the pivot guide sensor wheels, connected by a link to one of the rotatable pivot plates.
Figure 3:
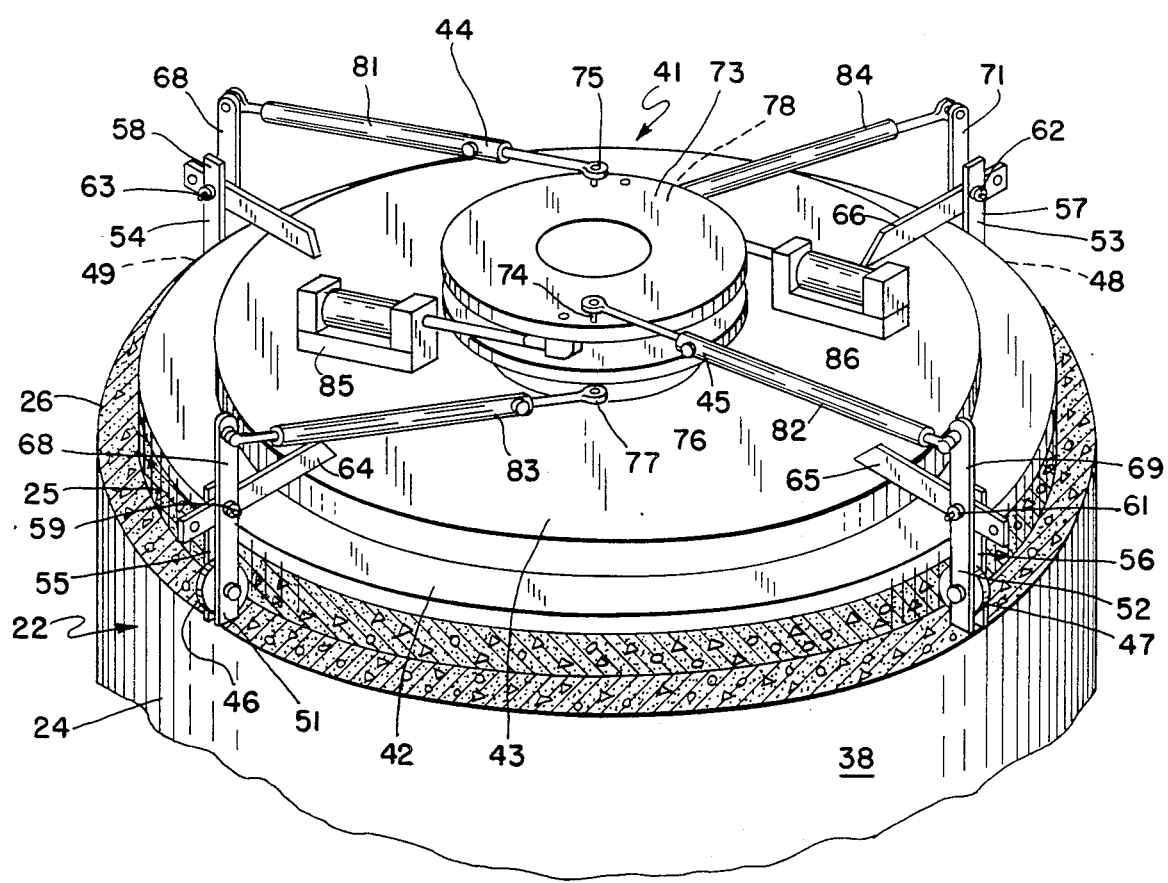
FIG. 3 is a diagrammatic perspective view showing how each two diametrically opposed pairs of mechanical sensors work together in centering the base plate of the apparatus.

As shown in FIG. 1, the grinding and grooving apparatus 21 may be applied to a concrete manhole riser, or pipe 22, which has been cast in a manner well known in the trade to include, or not to include, reinforcing rods 23 in the main body 24, a bell at the lower end, not shown, and a spigot 25 at the upper end 26.

There are usually no rods 23 in the spigot 25, and if a sealing groove is attempted to be cast therein, or to be cut therein, with the concrete still uncured and green, both the spigot and its sealing groove may have, or develop, flats, bumps, slumps or otherwise fail to be precisely circular and fail to fit the bell of another riser without leakage or breakage.

The grinding and grooving apparatus 21 of this invention is now well known in the trade, and is disclosed in my said co-pending patent application, Ser. No. 605,645, filed Apr. 30, 1984, entitled "Spigot Grinder and Groover".

In general, it consists of an elongated frame 27 suspended from a vertical hoist 28 and turnable in a horizontal plane, on a vertical axis. A motorized grinder carriage 29 is movable radially on one side of the frame 27, and a motorized groover carriage 31 is movable radially on the other side of the frame to balance each other. Electro-hydraulic centering means is provided in my said application for centering the rotatable frame and the grinding and grooving apparatus as it approaches the end face 32 of the spigot. Once centered on the end face 32, a set of clamp pistons such as 33, 34, and 35, one in each quadrant, move outwardly and radially to clamp against the inner face 36 of the riser or pipe 22. They maintain the apparatus 21 centered while the frame 27, grinder and cutter rotate around the spigot to cut the sealing groove 37 and grind the exterior circumferential face 38 of the spigot.

The mechanical centering apparatus 41 of the invention includes a circular, base plate 42, for non-rotatably resting on the end face 32 of the spigot and a rotatable support 43 upon which the frame 27 is mounted. Two pairs 44 and 45 of diametrically opposed centering guides 46, 47, 48 and 49 are provided, each pair 44 and 45 being oppositely disposed at 180° from the other. Each guide of each pair is located at the lower end, such as 51, 52, 53 or 54 of one of four guide arms 55, 56, 57 and 58, each arm being pivoted as at 59, 61, 62 and 63 to one of four extensions 64, 65, 66 and 67, affixed to the rotatable support 43.

Each guide arm 64, 65, 66 and 67 is provided with an integral upper portion 68, 69, 71 and 72, extending above the pivot.

At the center of the rotatable support 43 an upper pivot plate 73, having a pair of diametrically opposed projecting studs 74 and 75, and a lower pivot plate 76, having a pair of diametrically opposed, projecting studs 77 and 78, are mounted to rotate on the vertical axis of the rotatable support 43.

Two mechanical, elongated links 81 and 82, each connect the upper portion 68 or 69 of guide arm 58, or 56 to one of the studs on upper pivot plate 73 and two mechanical, elongated links 83 and 84, each connect the upper portion 71 or 72 of guide arms 55 or 57 to one of the studs 77 or 78 of lower pivot plate 76.

A fluid actuated piston and cylinder 85 on the rotatable support 43 is connected to the upper pivot plate 73, and a similar fluid actuated piston and cylinder 86 on rotatable support 43 is connected to the lower pivot plate 76. The devices 85 and 86 act in the manner of spring door closers to continuously impart a resistance to the linkage and centering wheels as the wheels are forced apart by the approach of the base plate and rotatable support toward the end face 32 of a spigot 25.

In operation, it will be seen that the opposite centering guides are mechanically linked to move in and out together.

Before the machine is lowered onto or pushed against the manhole riser or pipe both pairs of centering wheels are in the extended position. This allows an interference fit of approximately one inch between the opposite centering wheels and the spigot to be ground.

The machine is then lowered onto, or pushed against, the spigot and the centering wheels contact the top edge of the spigot. As the machine continues to advance toward the end of the spigot, the centering wheels are forced to open relative to each other and the machine is forced into being centered according to the two planes at 90° in which the centering wheels operate.

When the grinding machine comes to rest on the end of the spigot the centering guides are retracted, the grinding apparatus activates and the spigot is ground in a true circle and centered as closely as possible to the surface being ground.

I claim:

1. Centering apparatus for centering a base plate of spigot grinding apparatus, as the base plate is being advanced onto the end face of the spigot, for cutting of a sealing groove in, and grinding of a true truncated cone on the outer circumferential face, of the spigot, said apparatus being of the type having two pairs of diametrically opposed centering guides, each pair oppositely disposed at 180° and each guide of each pair being located at the lower end of one of four guide arms mounted on the rotatable support of said apparatus to pivot in a vertical plane on a horizontal axis, said apparatus characterized by:
   each said guide arm having an upper portion extending above said pivot;
   upper and lower superposed, pivot plates each mounted to rotate in a horizontal plane on a vertical axis at the center of said rotatable support, each pivot plate having a pair of diametrically opposed studs projecting vertically therefrom;
   two mechanical links connecting the diametrically opposed upper portions of two of said guide arms to the studs on said upper pivot plate and two mechanical links connecting the diametrically opposed upper portions of the other two guide arms to the studs on said lower pivot plate;
   and a pair of diametrically opposed hydraulic cylinder and piston actuators, mounted on said rotating support, each for yieldably resisting turning of said pivot plates and resisting opening of said guide arms while said guides are centering said base plate on said spigot end.

2. Centering apparatus as specified in claim 1 wherein:
   each said mechanical link comprises an elongated rod threadedly affixed in an elongated tubular cylinder to enable its length to be adjusted.

3. The low cost mechanical method of centering a grinding and cutting apparatus, having a base plate, on the end face of a vertically disposed spigot, free of reliance on electrical circuitry, by means of two pairs of contact guides, each mounted at the lower end of a guide arm mounted to pivot in a vertical plane, and each located in one of the four quadrants around said spigot and upper and lower pivot plates rotatable in a horizontal plane at the center of the base plate, said method comprising the step of:
   mechancially linking a diametrically opposed pair of said guide arms to said upper pivot plate;
   mechanically linking the other diametrically opposed pair of said guide arms to the lower pivot plate and;
   yieldably resisting the turning of both of said pivot plates so that the contact wheels on said guide arms will center said base plate as it is advanced onto the end face of a spigot.

* * * * *